(12) United States Patent
Larkin et al.

(10) Patent No.: US 10,588,305 B2
(45) Date of Patent: Mar. 17, 2020

(54) MARINE HUB WITH INTERCHANGEABLE ARMS

(71) Applicants: Harold F. Larkin, Three Mile Bay, NY (US); Susan N. Larkin, Three Mile Bay, NY (US)

(72) Inventors: Harold F. Larkin, Three Mile Bay, NY (US); Susan N. Larkin, Three Mile Bay, NY (US)

( * ) Notice: Subject to any disclaimer, the term of this patent is extended or adjusted under 35 U.S.C. 154(b) by 0 days.

(21) Appl. No.: 15/626,264

(22) Filed: Jun. 19, 2017

(65) Prior Publication Data

US 2018/0020651 A1  Jan. 25, 2018

Related U.S. Application Data

(60) Provisional application No. 62/364,464, filed on Jul. 20, 2016.

(51) Int. Cl.
| | | |
|---|---|---|
| *A01K 97/10* | (2006.01) | |
| *B63B 25/00* | (2006.01) | |
| *B60R 7/08* | (2006.01) | |
| B63B 29/04 | (2006.01) | |
| A01K 97/08 | (2006.01) | |
| B63B 29/06 | (2006.01) | |
| B63B 17/00 | (2006.01) | |

(Continued)

(52) U.S. Cl.
CPC ............... *A01K 97/10* (2013.01); *B60R 7/08* (2013.01); *B63B 25/002* (2013.01); *A01K 91/08* (2013.01); *A01K 97/08* (2013.01); *B63B 17/00* (2013.01); *B63B 25/00* (2013.01); *B63B 29/06* (2013.01); *B63B 2017/0054* (2013.01); *B63B 2029/043* (2013.01); *F16M 13/022* (2013.01)

(58) Field of Classification Search
CPC ........ A01K 97/10; A01K 91/08; A01K 97/08; A01K 91/053; B63B 2017/0054; B63B 25/002; B63B 29/06; B63B 2029/043; E04H 2017/1452; E04H 2017/1473; E04H 2017/1491; E04H 17/1421; E04H 17/1434; G09F 7/18; G09F 2007/1804; G09F 2007/1817; G09F 2007/1826; F16M 13/022
USPC ............. 256/65.02, 65.04, 65.05; 248/230.5, 248/230.1, 316.1, 512, 534, 228.1, 214; 224/922, 200, 197; 114/364
See application file for complete search history.

(56) References Cited

U.S. PATENT DOCUMENTS 1,651,953 A    12/1927  Hayden
1,709,898 A  *  4/1929  Cunneen ................... F16L 1/10
                                                    248/70

(Continued)

*Primary Examiner* — Hiwot E Tefera
*Assistant Examiner* — Taylor L Morris
(74) *Attorney, Agent, or Firm* — Bernhard P. Molldrem, Jr.

(57) ABSTRACT

A marine hub attaches to a boat pedestal, dock support or other vertical support post, and has removable interchangeable attachment arms that radiate from a main body tube or disk that fits around the support post. The main body tube has a bore with an inside diameter just larger than the diameter of the support post. An adapter ring may be used within the bore of the main body tube for mounting on posts that are smaller, or not cylindrical. Support stub members radiate from the main body tube, and the attachment arms secure to these with quick release pins. The support arms may be used with fishing or boating accessories, beverage holders, or other equipment.

15 Claims, 15 Drawing Sheets

(51) Int. Cl.
*F16M 13/02* (2006.01)
*A01K 91/08* (2006.01)

(56) References Cited

U.S. PATENT DOCUMENTS

| | | | | |
|---|---|---|---|---|
| 1,719,695 A * | 7/1929 | Ferguson | A01K 97/10 | 224/922 |
| 2,196,472 A * | 4/1940 | Moriarty | A01K 91/053 | 43/21.2 |
| 2,215,283 A * | 9/1940 | Adler | F16L 3/1233 | 138/107 |
| 2,339,138 A * | 1/1944 | Black | F16L 33/04 | 24/275 |
| 2,529,148 A * | 11/1950 | Fratt | A01K 97/10 | 248/515 |
| 2,607,398 A * | 8/1952 | Andrews | A01K 97/10 | 108/150 |
| 2,659,972 A * | 11/1953 | Norris | B25H 7/005 | 33/21.3 |
| 2,946,546 A * | 7/1960 | Pokorny | A01K 97/10 | 248/230.5 |
| 3,056,571 A * | 10/1962 | Schofield | A62C 33/04 | 24/19 |
| 3,186,666 A * | 6/1965 | Williams | A01K 97/10 | 248/519 |
| 3,307,710 A * | 3/1967 | Negri | A47G 25/06 | 211/119.009 |
| 3,371,443 A * | 3/1968 | Dobson | A01K 97/12 | 43/17 |
| 3,385,545 A * | 5/1968 | Patton | F16L 3/222 | 248/228.5 |
| 3,524,627 A * | 8/1970 | Boyanton | E04H 17/1413 | 248/230.5 |
| 3,545,710 A * | 12/1970 | Mooney | F16M 11/10 | 248/183.2 |
| 3,667,708 A * | 6/1972 | Smeltzer | A01K 97/10 | 220/735 |
| 3,964,706 A * | 6/1976 | Adams | A01K 97/10 | 43/21.2 |
| 4,074,893 A * | 2/1978 | Coltrin | E04H 17/1434 | 256/21 |
| 4,103,853 A * | 8/1978 | Bannan | H02B 5/02 | 211/107 |
| 4,198,775 A * | 4/1980 | Leisner | A01K 97/10 | 43/21.2 |
| 4,270,724 A | 6/1981 | McMullen | | |
| 4,388,774 A * | 6/1983 | Thoemke | A01K 91/08 | 114/255 |
| 4,428,617 A | 1/1984 | Lawson | | |
| 4,527,349 A * | 7/1985 | Emory, Jr. | A01K 97/10 | 248/513 |
| 4,551,939 A * | 11/1985 | Kitchens | A01K 97/10 | 248/513 |
| 4,566,819 A * | 1/1986 | Johnston | E04G 7/14 | 403/385 |
| 4,641,395 A * | 2/1987 | Banks | A01K 91/08 | 16/348 |
| 4,645,167 A | 2/1987 | Hardwick | | |
| 4,753,029 A * | 6/1988 | Shaw | A01K 97/10 | 248/538 |
| 4,763,435 A * | 8/1988 | Deering | A01K 97/10 | 43/21.2 |
| 4,793,086 A * | 12/1988 | Cup | A01K 97/10 | 43/21.2 |
| 4,823,723 A * | 4/1989 | Brooks | A01K 97/10 | 114/343 |
| 4,852,291 A * | 8/1989 | Mengo | A01K 97/10 | 43/21.2 |
| 4,854,069 A * | 8/1989 | Smith | A01K 97/10 | 43/21.2 |
| 4,869,195 A * | 9/1989 | Eichfeld | A01K 97/10 | 114/364 |
| 4,889,064 A * | 12/1989 | Rupp, III | A01K 91/08 | 114/89 |
| 4,901,970 A * | 2/1990 | Moss | A01K 97/10 | 224/282 |
| 4,930,436 A * | 6/1990 | Newman | G01P 13/02 | 248/230.5 |
| 4,932,152 A * | 6/1990 | Barlotta | A01K 97/10 | 248/515 |
| 4,951,925 A * | 8/1990 | Schultz | E04H 17/1421 | 256/22 |
| 4,964,233 A * | 10/1990 | Benson | A01K 97/10 | 43/17 |
| 5,000,412 A | 3/1991 | Sheehan et al. | | |
| 5,054,229 A * | 10/1991 | Hughes | A01K 97/10 | 43/21.2 |
| 5,295,321 A * | 3/1994 | Matura | A01K 97/10 | 248/214 |
| 5,435,093 A * | 7/1995 | Minorics | A01K 97/10 | 43/19.2 |
| 5,481,822 A | 1/1996 | Engels | | |
| 5,533,295 A * | 7/1996 | Hochberger | A01K 97/10 | 248/512 |
| 5,546,693 A * | 8/1996 | Stockton | A01K 97/10 | 248/514 |
| 5,564,217 A * | 10/1996 | Riedell | A01K 97/10 | 43/21.2 |
| 5,597,148 A | 1/1997 | Gospodarich | | |
| 5,634,619 A * | 6/1997 | Alessi | A47B 57/565 | 248/219.3 |
| 5,673,507 A * | 10/1997 | Stokes, Jr. | A01K 97/10 | 114/364 |
| 5,685,107 A * | 11/1997 | Sweet | A01K 97/10 | 43/21.2 |
| 5,690,416 A * | 11/1997 | Van Gennep | B25B 5/006 | 362/191 |
| 5,791,613 A * | 8/1998 | Grable | A01K 91/08 | 248/200.1 |
| 5,795,503 A * | 8/1998 | Krake | E04H 17/1413 | 256/19 |
| 5,813,646 A * | 9/1998 | Bartholomae | B63B 29/06 | 248/230.7 |
| 5,816,736 A * | 10/1998 | Kroulik | B25J 19/0025 | 403/389 |
| 5,961,242 A * | 10/1999 | Leone | E04H 17/1421 | 248/228.1 |
| 5,987,804 A | 11/1999 | Shearer et al. | | |
| 5,992,804 A * | 11/1999 | Johnson | B63B 29/06 | 114/363 |
| 6,237,821 B1 * | 5/2001 | Owen | A01K 97/10 | 224/197 |
| 6,289,627 B1 * | 9/2001 | Gibbs | A01K 97/10 | 43/21.2 |
| 6,370,810 B1 * | 4/2002 | Widerman | A01K 97/10 | 24/16 PB |
| 6,438,889 B1 * | 8/2002 | Handy | A01K 97/10 | 248/166 |
| 6,575,652 B2 * | 6/2003 | Krauss | F16D 1/087 | 403/49 |
| 6,681,517 B1 * | 1/2004 | Solomon | A01K 97/10 | 43/21.2 |
| 6,684,555 B1 * | 2/2004 | Vela | A01K 97/11 | 43/15 |
| 6,698,725 B1 * | 3/2004 | Berry | E04H 17/066 | 256/11 |
| 6,718,682 B1 * | 4/2004 | Seitsinger | A01K 97/10 | 248/513 |
| 6,739,084 B1 * | 5/2004 | Hansen | A01K 97/08 | 43/21.2 |
| 6,802,150 B2 * | 10/2004 | Harden | A01K 97/10 | 43/21.2 |
| 6,802,496 B1 * | 10/2004 | Preta | E04H 17/1413 | 16/253 |
| 6,808,231 B1 * | 10/2004 | Hill | B60R 9/06 | 296/26.09 |
| 6,817,107 B1 * | 11/2004 | Rabalais, Jr. | E04G 21/1833 | 33/1 LE |

(56) References Cited

U.S. PATENT DOCUMENTS

| | | | |
|---|---|---|---|
| 6,829,853 B2 * | 12/2004 | Kim | G09F 7/18 248/214 |
| D507,817 S * | 7/2005 | Mitchell | D22/147 |
| 7,007,906 B2 * | 3/2006 | Slatter | A01K 91/08 114/255 |
| 7,043,869 B1 * | 5/2006 | Hubbard | A01K 97/10 43/21.2 |
| 7,047,688 B2 | 5/2006 | Sandman, Jr. | |
| 7,146,763 B1 * | 12/2006 | Stanton | A01K 97/10 43/21.2 |
| 7,150,578 B2 * | 12/2006 | Porco | F16B 2/06 403/60 |
| RE39,842 E * | 9/2007 | Purvis | E04G 21/3223 182/113 |
| 7,296,377 B2 * | 11/2007 | Wilcox | A01K 91/08 114/255 |
| 7,331,138 B1 * | 2/2008 | Wegman | A01K 97/10 248/523 |
| 7,350,755 B1 | 4/2008 | Harrison | |
| 7,395,772 B2 * | 7/2008 | Slatter | A01K 97/10 114/343 |
| 7,434,772 B1 * | 10/2008 | Jou | A45D 20/14 248/124.2 |
| 7,530,324 B2 * | 5/2009 | Salerno | A01K 97/10 114/364 |
| 7,650,713 B1 * | 1/2010 | Peede | A01K 97/10 43/21.2 |
| 7,686,276 B1 * | 3/2010 | McCauley | A01K 97/10 224/922 |
| 7,744,046 B1 * | 6/2010 | Lundy | B60R 11/02 248/121 |
| 7,765,732 B1 * | 8/2010 | Canevari | A01K 97/10 224/200 |
| 7,882,795 B1 * | 2/2011 | Snyder | B63B 29/04 114/363 |
| 7,941,964 B2 * | 5/2011 | Stanton | A01K 97/10 248/512 |
| 8,128,045 B2 | 3/2012 | Skaggs | |
| 8,231,035 B1 * | 7/2012 | Michael | B60R 7/02 224/403 |
| 8,453,373 B2 * | 6/2013 | Gordon | A01K 97/10 248/534 |
| 8,490,937 B2 | 7/2013 | Crain et al. | |
| 8,631,551 B1 * | 1/2014 | Payne | E04H 17/143 29/428 |
| 8,689,938 B2 * | 4/2014 | Kenton | E04G 21/3233 182/113 |
| 8,800,788 B1 * | 8/2014 | Guidry | A01K 97/10 211/70.8 |
| 9,357,756 B2 | 6/2016 | Davis | |
| 9,532,559 B1 * | 1/2017 | Hemmerlin | A01K 97/10 |
| 9,555,862 B1 * | 1/2017 | Sutherland | B63B 17/04 |
| 9,682,759 B1 * | 6/2017 | Huntley | F16M 13/022 |
| 2002/0096610 A1 * | 7/2002 | Fernandez | G09F 7/18 248/218.4 |
| 2003/0230684 A1 | 12/2003 | Clary | |
| 2005/0102881 A1 * | 5/2005 | Legendziewicz | A01K 97/10 43/21.2 |
| 2005/0151040 A1 * | 7/2005 | Hsu | B62J 11/00 248/214 |
| 2006/0231723 A1 * | 10/2006 | Fayerman | A01K 97/10 248/540 |
| 2007/0044367 A1 * | 3/2007 | Slatter | A01K 97/10 43/21.2 |
| 2007/0187447 A1 * | 8/2007 | Hamann | A01K 97/08 224/519 |
| 2008/0173856 A1 * | 7/2008 | Payne | E04H 17/161 256/47 |
| 2008/0185493 A1 * | 8/2008 | Wakefield | A01K 97/06 248/512 |
| 2009/0032669 A1 * | 2/2009 | Ritter | B60N 2/146 248/415 |
| 2009/0032792 A1 * | 2/2009 | Ford | E04F 11/1834 256/67 |
| 2009/0139132 A1 | 6/2009 | Knight | |
| 2010/0108626 A1 * | 5/2010 | Sorensen | A01K 97/08 211/70.8 |
| 2010/0269399 A1 * | 10/2010 | Gordon | A01K 97/10 43/21.2 |
| 2011/0107652 A1 * | 5/2011 | Getzinger | A01K 91/065 43/19.2 |
| 2011/0233357 A1 * | 9/2011 | Owen | A01K 97/10 248/224.8 |
| 2012/0073488 A1 * | 3/2012 | Temple | A01K 97/10 114/267 |
| 2013/0008074 A1 * | 1/2013 | Browne | A01K 97/10 43/21.2 |
| 2013/0333268 A1 * | 12/2013 | Henry, Jr. | A01K 97/10 43/4.5 |
| 2014/0223745 A1 * | 8/2014 | Eberhart | F16B 7/044 29/897.31 |
| 2017/0305508 A1 * | 10/2017 | Thomason | B63B 29/06 |
| 2018/0110335 A1 * | 4/2018 | O'Hagan | A01K 97/22 |

\* cited by examiner

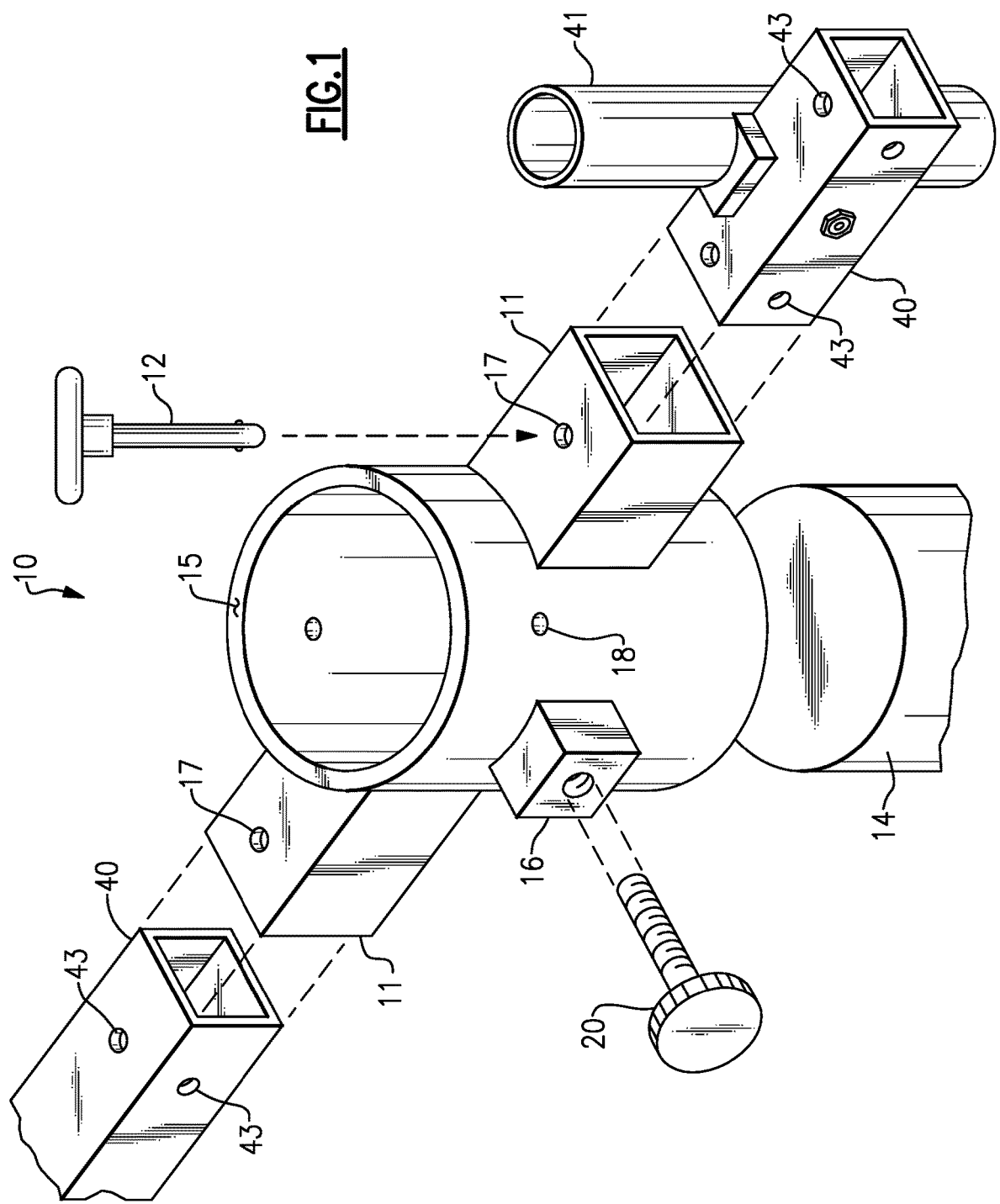

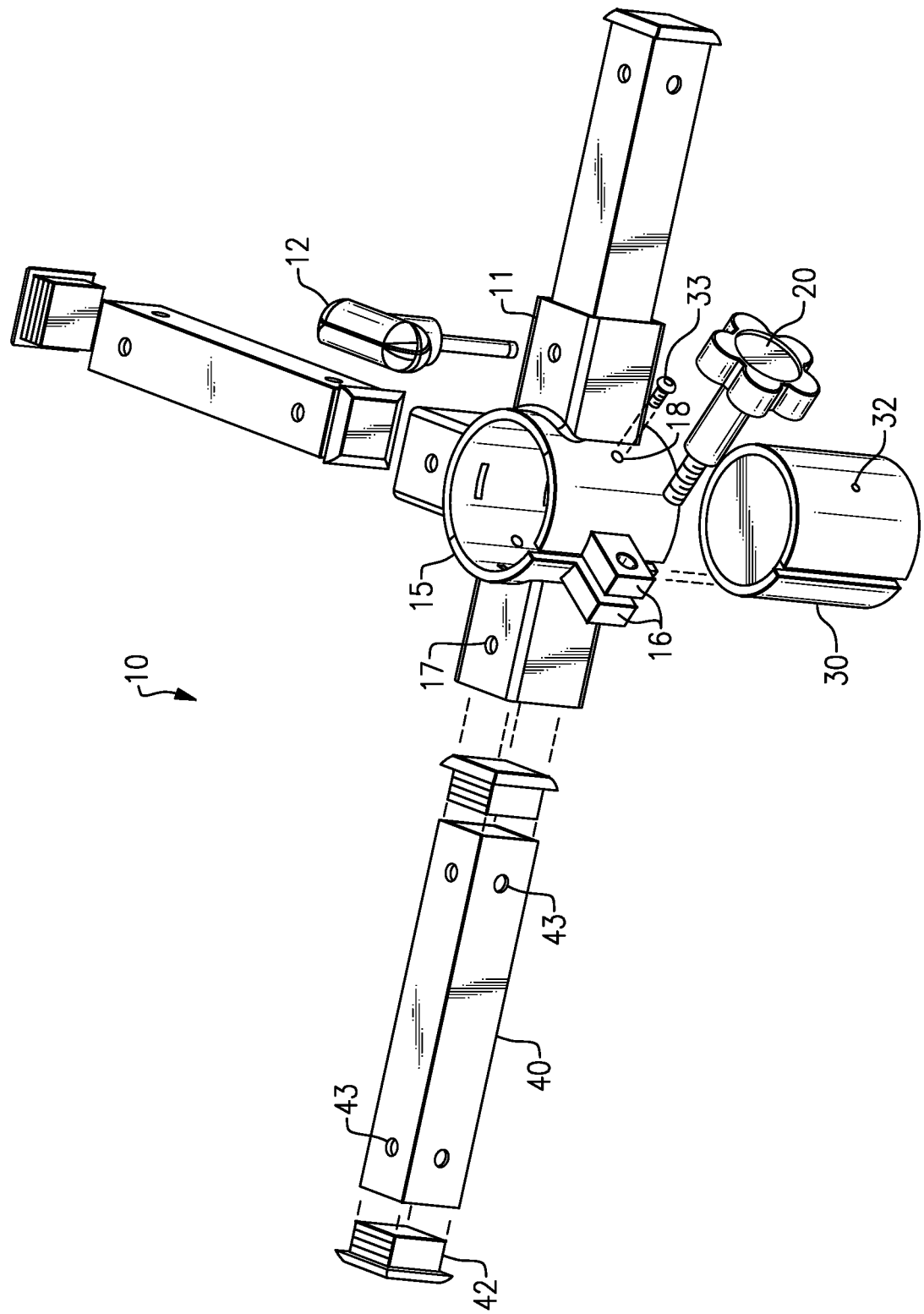

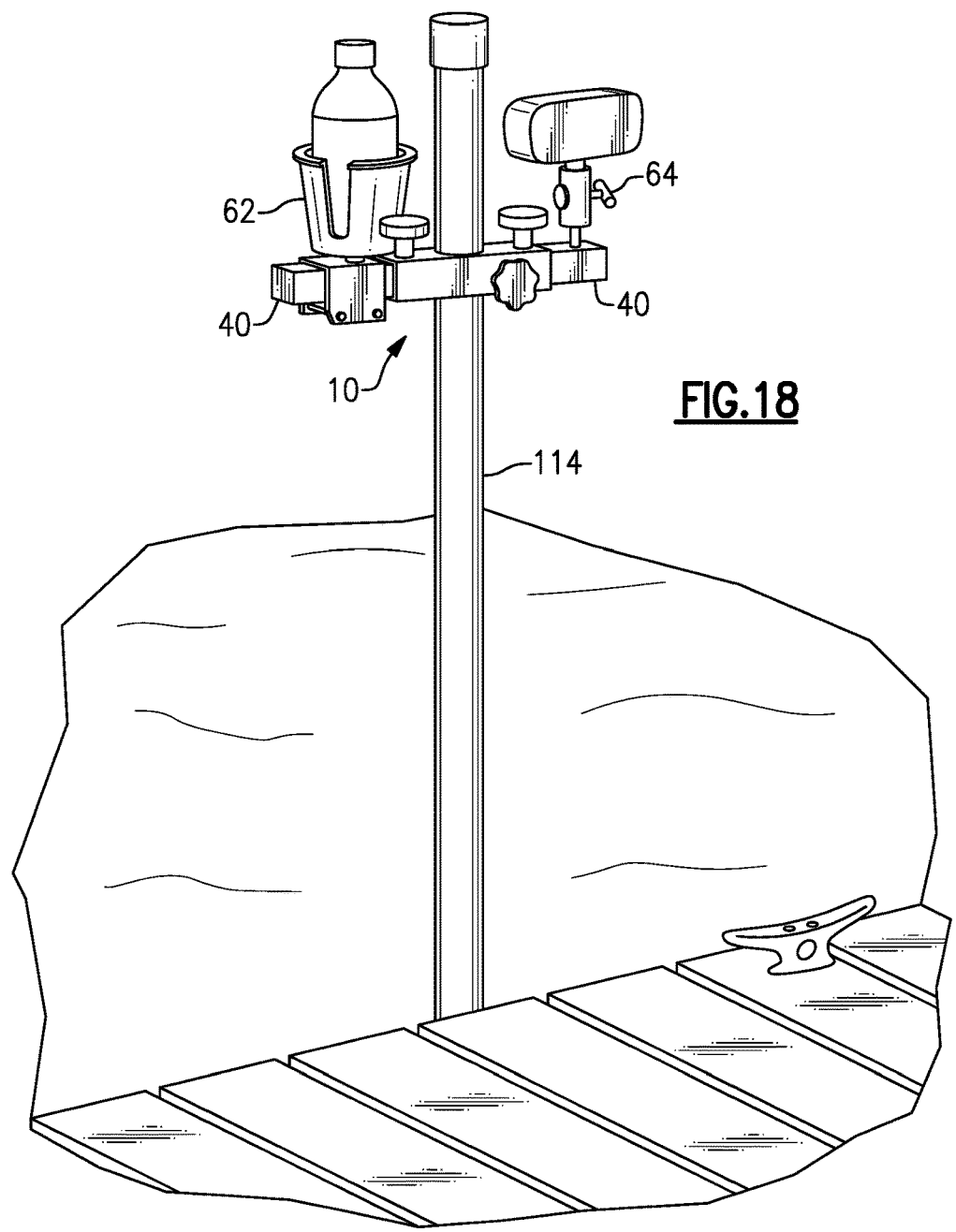
FIG. 18
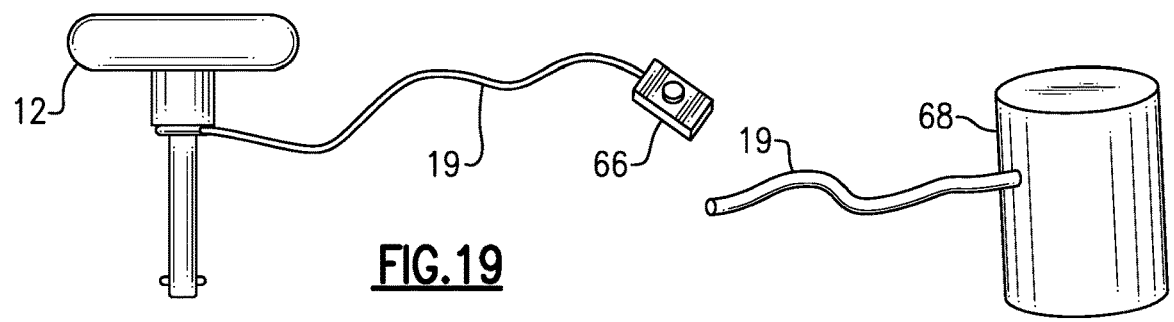
FIG. 19
FIG. 20

MARINE HUB WITH INTERCHANGEABLE ARMS

This application claims priority of Provisional Application Ser. No. 62/364,464, filed Jul. 20, 2016, and the contents of which are incorporated herein by reference.

BACKGROUND OF THE INVENTION

This invention is directed to a marine hub device with interchangeable arms, for mounting of fishing boating and other equipment and which may be supported on a seat pedestal or other post, e.g., boat pedestals and dock support posts.

The marine hub is a boating accessory which may be tubular, disk-shape, cylindrical, square, rectangular or in the form of a hexagonal or octagonal member that fits over or around the seat pedestal or other post, and which has a number of projecting members that extend generally horizontally and generally radially out from the support post, and onto which a variety of attachment arms can be mounted. The attachment arms may include such accessories as a rod holder, a bait holder, or a support for a camera or entertainment device, for example. An adapter ring or sleeve may be included, as necessary, to match the inside diameter of the marine hub to the diameter of the support post.

The main object of this invention is to provide a highly adaptable device for supporting various tools, appliances and accessories from the generally cylindrical seat pedestal of a fishing boat, or on any of a wide variety of similar vertical tubular posts, such as dock posts. The device has a hub portion that mounts around the outer diameter of the pedestal, and an arrangement for tightening the hub onto the pedestal, and also has a number of interchangeable arms that fit onto (or into) members that radiates out from the hub. In some cases the radial members on the arms can be male stubs that fit into female sockets on the inside end of the interchangeable arms, but alternatively the arrangement could have female sockets on the radial members to each receive a male fitting on the inward end of the respective interchangeable arm. Because the female socket portion can be on either the stub or the arm, and the complementary male portion may be on the arm or on the stub, the term "socket member" will be used in the description and in the claims to refer generally to either arrangement. The arms may be straight and entirely horizontal, but may also have a downward or upward bend, or an offset so they radiate above or below the level of the hub. The concept is certainly not limited only to a single embodiment or a few embodiments, but can take on a wide variety of forms. The hub and arms may be steel or aluminum, and a number of high-strength technical plastic resins are available for use in the hub or in the interchangeable arms.

In keeping with a number of important aspects of the invention, a marine hub may comprise a generally round-profile hub body member having a vertically oriented central bore adapted to fit snugly onto a vertical generally cylindrical support post, such as a seat pedestal. The body member fits snugly and securely onto the support post in any of a number of ways, releasably gripping the support post to hold the body member securely in place on it. A plurality of support plug members or support stub members protrude generally and horizontally outward from the hub body member and a plurality of elongated attachment arms each have a (male or female) a socket member formed at a radially inward end and adapted for fit removably onto or into a respective one of the support plug or stub members. The terms "plug" and "stub" may be used somewhat interchangeably to refer to the members affixed to the hub body and onto which the support arms are removably supported. For secure attachment, the plug or stub members and the socket members of the attachment arms each have at least one through bore configured such that the through bores align when the respective attachment arms are placed onto or into the associated support stub or plug members. One or more retaining pins are provided so that at least one retaining pin can penetrate the aligned through bores of the support stub or plug members and attachment arms to hold the attachment arms removably in place supported onto the marine hub body member. The support plugs or stubs can favorably be of square cross section and the socket members of the attachment arms being square tubular members. Alternatively, the support plugs or stubs can be of polygonal cross section and the corresponding socket members of the attachment arms may be of round, octagonal, or hexagonal section.

The arrangement for the hub body member releasably gripping the vertical post or pedestal can include a split adapter ring fitting within the central bore of the hub body member. Alternatively, the hub body member may take the form of a split tube having an axial gap therein with a pair of lugs affixed to the split tube on opposite sides of the gap, and can employ a hand screw or cam-action clamping member to serve as compressing means for drawing the lugs towards one another to compress the central bore against said support post. The cam-action clamping member can include a cam action clamp having a pin passing through the lugs, and a with lever-action cam disposed on one end of the pin.

The hand screw arrangement would have a threaded rod passing through an opening in one of said lugs and engaging a threaded bore in the other of the lugs.

In a favorable embodiment, there are three of such stub or plug members and three attachment arms, disposed on the hub body member at a nine-o'clock position, a twelve-o'clock position, and a three-o'clock position, respectively.

An adapter ring can be fitted into the central bore of the body member, and can have an outer diameter to match the inner diameter of the central bore and an inner diameter to match the outer diameter of the cylindrical support post.

The at least one retaining pin can be a quick-release pin having a hand grip at one end, and a lanyard attached to the grip or to the pin, so that the pin is not lost overboard.

Favorably the plurality of elongated attachment arms can include at least one extruded tubular member having a gap formed along one side and a keyway formed within it, and adapted for receiving keyway-mounted accessories.

In some embodiments, the hub body member may be formed as two halves with an axial hinge connecting the two halves and a compressive clamp securing the two halves of the hub body member onto the support post.

The hub body member may be formed of a pair of half-rings with a pair of bolts that secure the two half-rings to one another onto the support post.

The above and many other aspects of the invention will become apparent from the ensuing detailed description of a few selected embodiments, as explained in connection with the accompanying Drawing figures.

BRIEF DESCRIPTION OF THE DRAWING

FIG. 1 and FIG. 2 are partially exploded perspective views of pedestal-mounted marine hub assemblies, according to embodiments of this invention.

FIG. 9A shows a portion of another embodiment, while

FIG. 18 shows an embodiment of the marine hub in position on a dock post.

FIGS. 19 and 20 illustrate a retaining pin with safety lanyard.

DETAILED DESCRIPTION OF A PREFERRED EMBODIMENTS

Figure 2A:
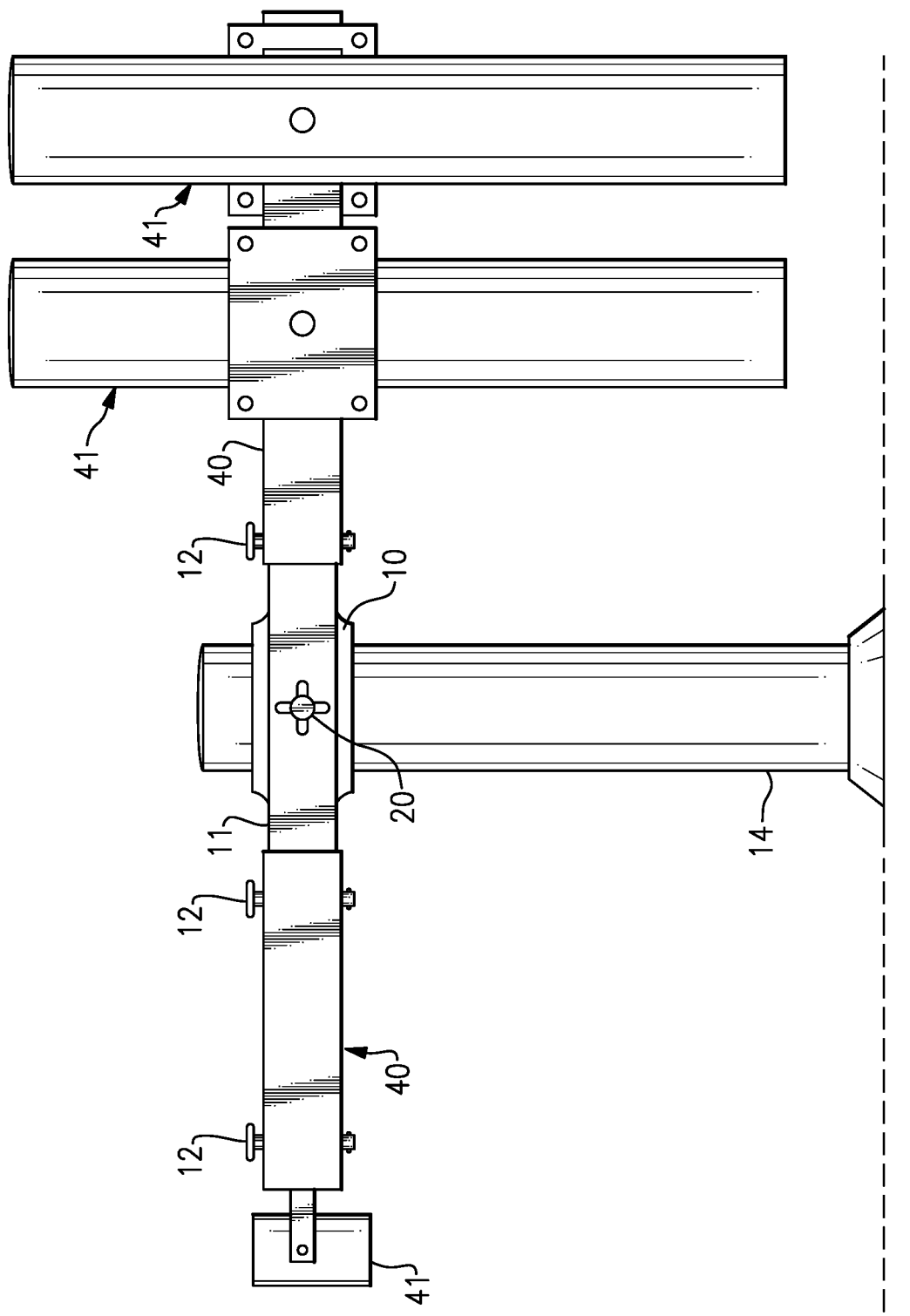
FIG. 2A is an elevational view of a variation of an embodiment of this invention.

The marine hub 10 of this invention is configured to slide onto a cylindrical pedestal 14 or similar mounting post, and has a circular bore machined through it vertically, creating a main body tube 15. The main body tube should have an inside diameter just larger than the outside diameter of the pedestal 14 so there is sufficient clearance for the marine hub to slide on and off without undue lateral movement. There are lateral protrusions 11, i.e. stubs, that radiate from the main body tube 15 and support removable attachment arms 40 that continue in a generally horizontal direction away from the pedestal or other mounting post. The marine hubs are favorably formed of a non-corrosive metal such as aluminum or stainless steel, but may also be made of a tough plastic resin, such that the marine hub may be die cast (from a marine-grade aluminum) or injection molded from a suitable polymer resin, which may include a UV protectant and/or other additives to protect against environmental degradation. The marine hub 10 may have a powder coating, anodized finish, or may be painted. In several embodiments, the attachment arms 40 are square tubular members, but these are not limited to members of that profile, and may be hexagonal, octagonal, round, oval, or rectangular in profile. A variety of types of clamp screw may be used to secure the marine hub onto the supporting pedestal or post, favorably with a plastic or metal knob or wheel and stainless steel threaded shaft, which may have a nylon or other polymer tip. The clamp screw may be used as part of a compression type clamping mechanism to squeeze the main tube body 15 against the pedestal 14.

FIG. 1 is an exploded perspective view of one embodiment of the marine hub 10 according to the present invention. Here a pair of square cross-section tubular stubs 11, 11 serve as sockets into which attachment arms 40 are fitted. The marine hub 10 has a one-piece, generally cylindrical main body tube 15 onto which the stubs 11 are welded or otherwise rigidly affixed, and for each attachment arm 40 a quick-release pin 12 fits into matching pin openings 17 and 43 on the stub 11 and attachment arm 40, respectively. One such pin 12 is shown here, but there would be a sufficient number to attach the attachment arms 40 to the associated plugs 11. As seen here and in other drawing views, each quick release pin 12 has a handle affixed at one end and a smooth shaft not secured by threads to the stub 11 or attachment arm 40. The main body tube 15 is of a diameter to fit over a seat post or pedestal 14 with minimal clearance. A threaded hand screw member 20 fits into a threaded opening in a block member 16 on the main body tube, and the hand screw member can be tightened down against the pedestal 14 or similar mounting post to secure the body tube portion of the marine hub onto the post.

As also shown here a tubular holder member 41 is secured to one side of the attachment arm 40. This tubular member may be a rod holder, or a socket for a pole or post of an accessory to be attached to the attachment arm of the marine hub. There may be pin openings 43 on sides as well as top and bottom surfaces of the marine hub attachment arms 40, so that the attachment arms 40 may be installed in any of four orientations.

FIG. 2 illustrates a variation of this same arrangement of a marine hub 10. Here the one-piece tubular body member 15 has three support stub members 11 oriented at ninety degree intervals, i.e., at the nine-o'clock, twelve-o'clock and three-o'clock positions. In this embodiment, the main body tube has a longitudinal slit or gap with threaded block members or lugs 16 on either side of the gap. A hand screw 20 fits into the openings in the lugs 16, and can be tightened pull the sides of the gap. Also as shown here a small adapter retaining screw 33 can be fitted into a threaded opening or aperture 18 that extends radially through the body tube 15. A split-tube adapter ring 30 here is shown with a threaded opening to fit and receive the adapter retaining screw 33. As also shown here, a narrow slit in the adapter ring 30 aligns with the slit in the body tube 15 of the marine hub 10. The adapter ring may or may not be needed, depending on the diameter of the associated post or pedestal, not shown here.

As a further feature, the attachment arms 40 each have a removable square end plug 42 at one end, at least, and favorably at each end. These prevent entry of water and contaminants into the interior of the attachment arms 40, which is especially important in a salt water or brackish environment.

Figure 3A:
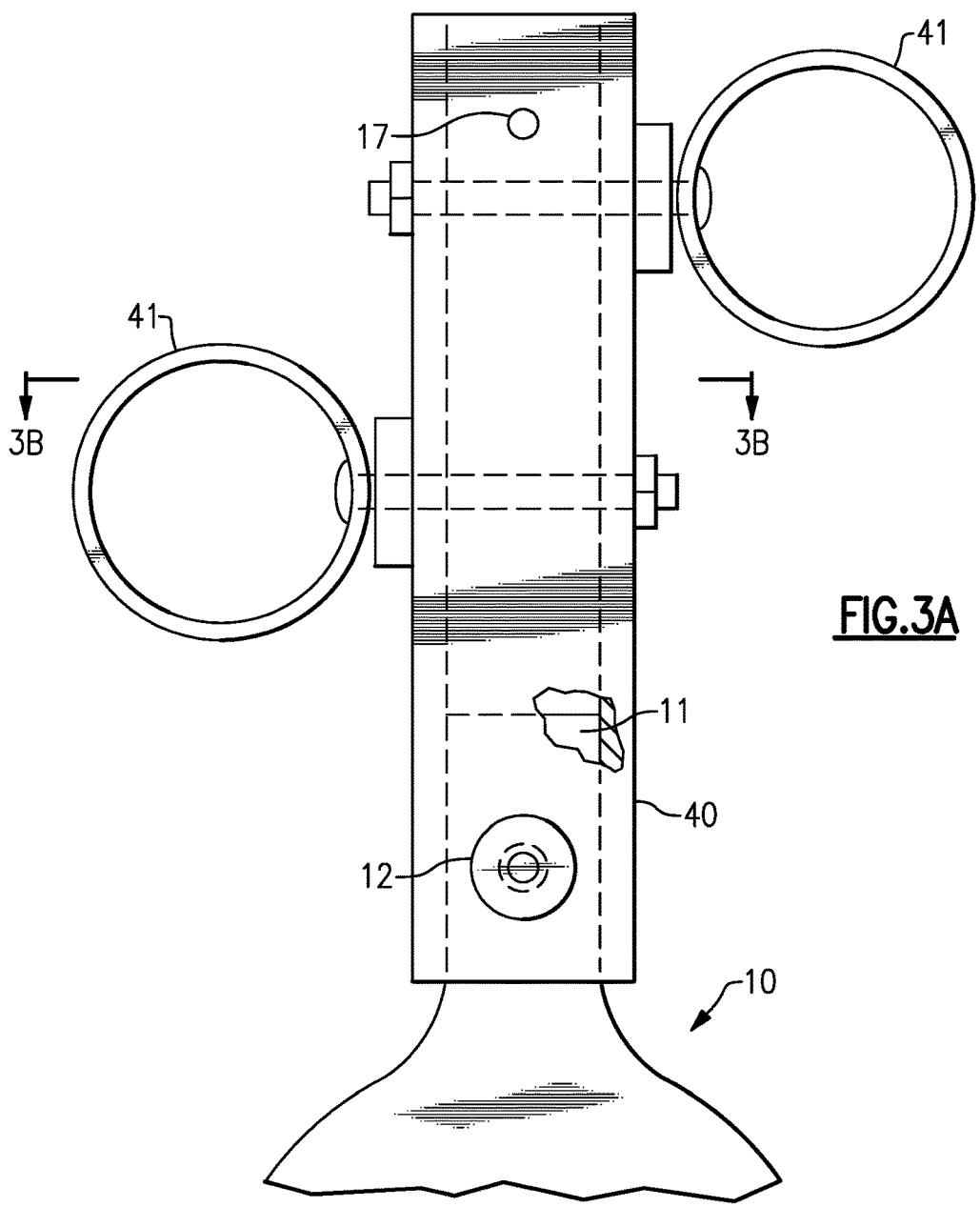
FIG. 3A is a plan view of a portion of another embodiment, with FIG. 3B showing a portion thereof in cross section.
Figure 3B:
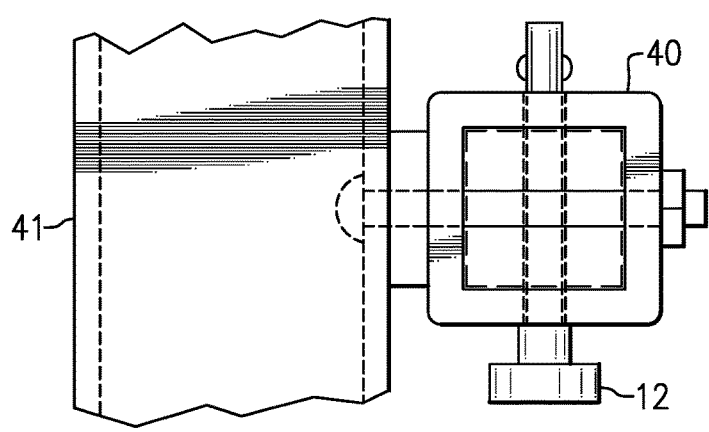

FIG. 2A is an elevational view of a variation of this embodiment, here shown with a disk-like tubular body 10 fitted onto pedestal 14 and held in place with hand screw 20, with projecting support stub members 11 fitting into respective attachment arms 40, 40 one shown at the left and the other at the right. Removable attachment pins 12 are shown here securing the attachment arms to the support stub members 11, with another pin 12 securing a tubular rod holder 41 to the end of the left attachment arm 40. In this case a portion of the rod holder 41 fits into the hollow interior of the attachment arm, and has a pin opening (not shown) that can receive the pin 12. A pair of tubular holders 41, 41 shown to the right can be attached by sliding them over the exterior of the right-side attachment arm 40. FIG. 3A is a partial plan view illustrating a pair of tubular holder members 41, each mounted using a horizontal threaded member extending through the attachment arm 40 and held in place with a mating nut.

Figure 4:
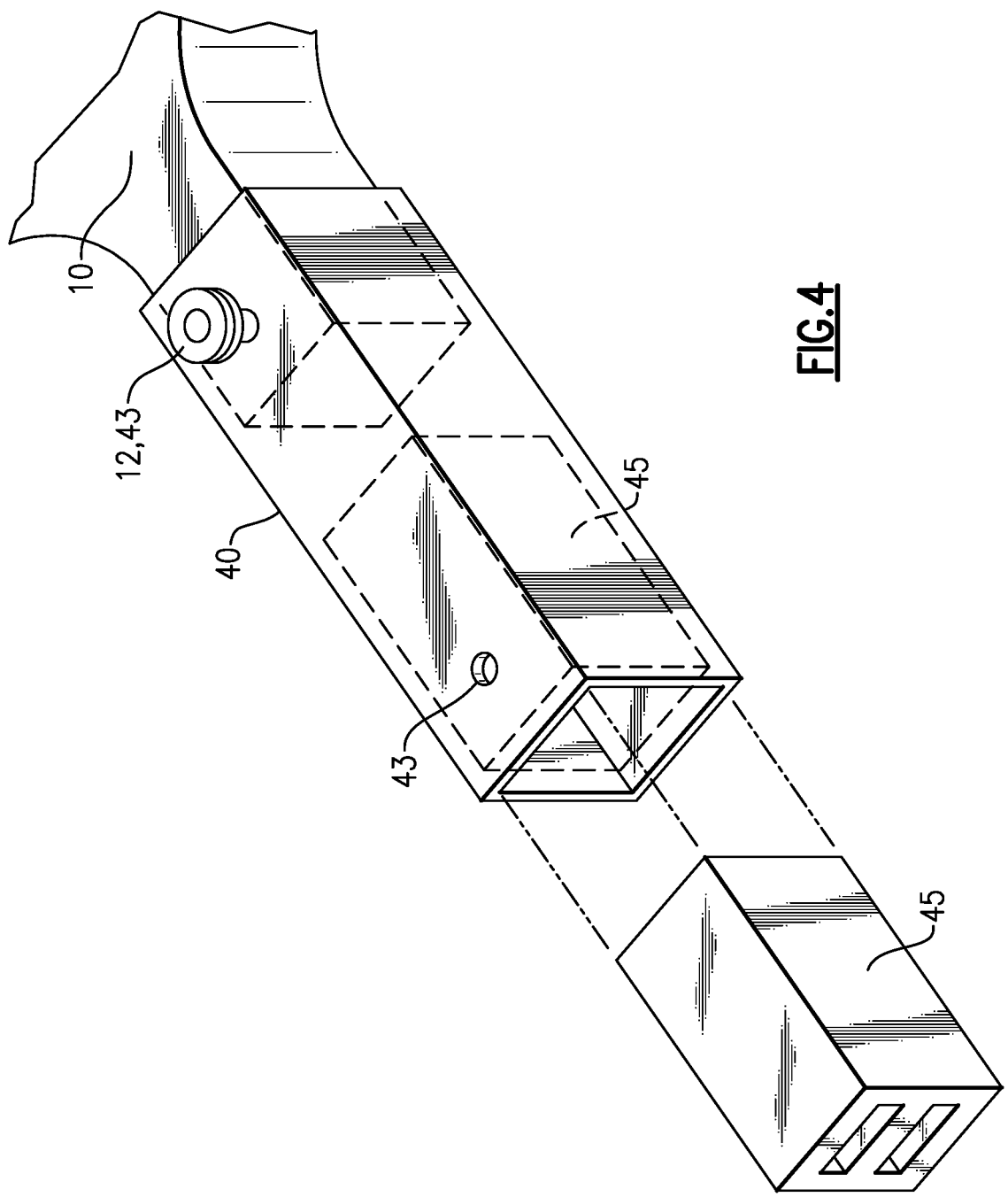
FIG. 4 is a perspective view of a variation thereof.

As an alternative, as shown in FIG. 4, an auxiliary USB plug 45, with two associated USB ports, may be fitted into the end of one of the attachment arms 40. Internal wiring is not shown here. This may be used to provide power and or data communication for an electronic device (not shown).

Figure 5:
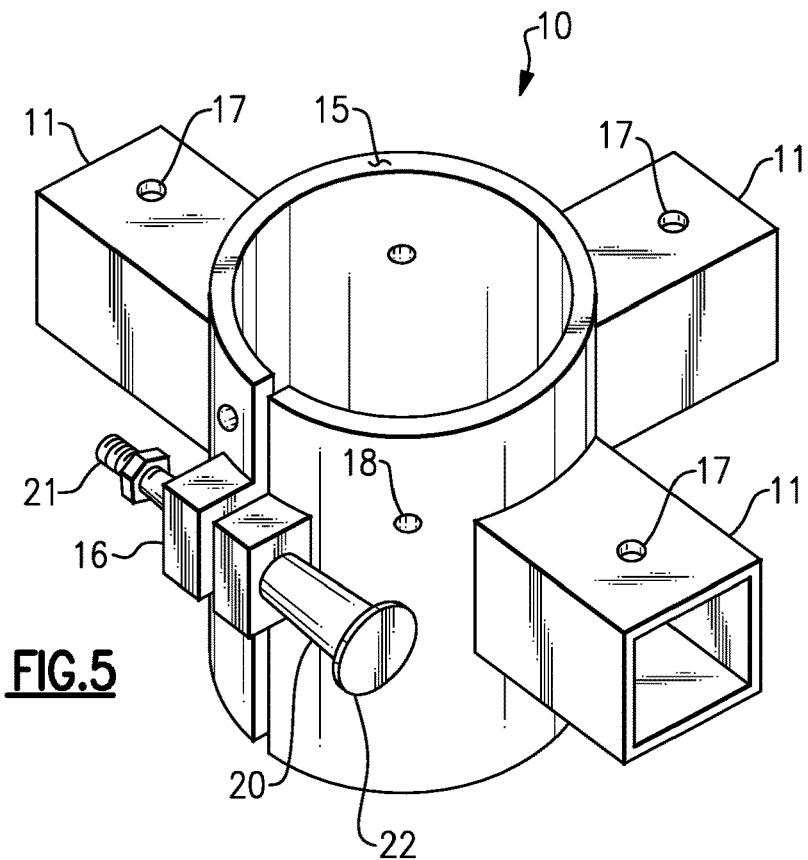
FIG. 5 shows a variation of these embodiments.

FIG. 5 shows a marine hub 10 with a clamp screw 20 having a generally cone-shaped hand knob 22 and a threaded rod 21 extending through clamping lugs 16 and which may be secured using a hex nut. Optionally, a number of set screw openings 18 may be provided to receive a threaded screw member and which may provide added grip against the associated pedestal or support post.

Figure 6:
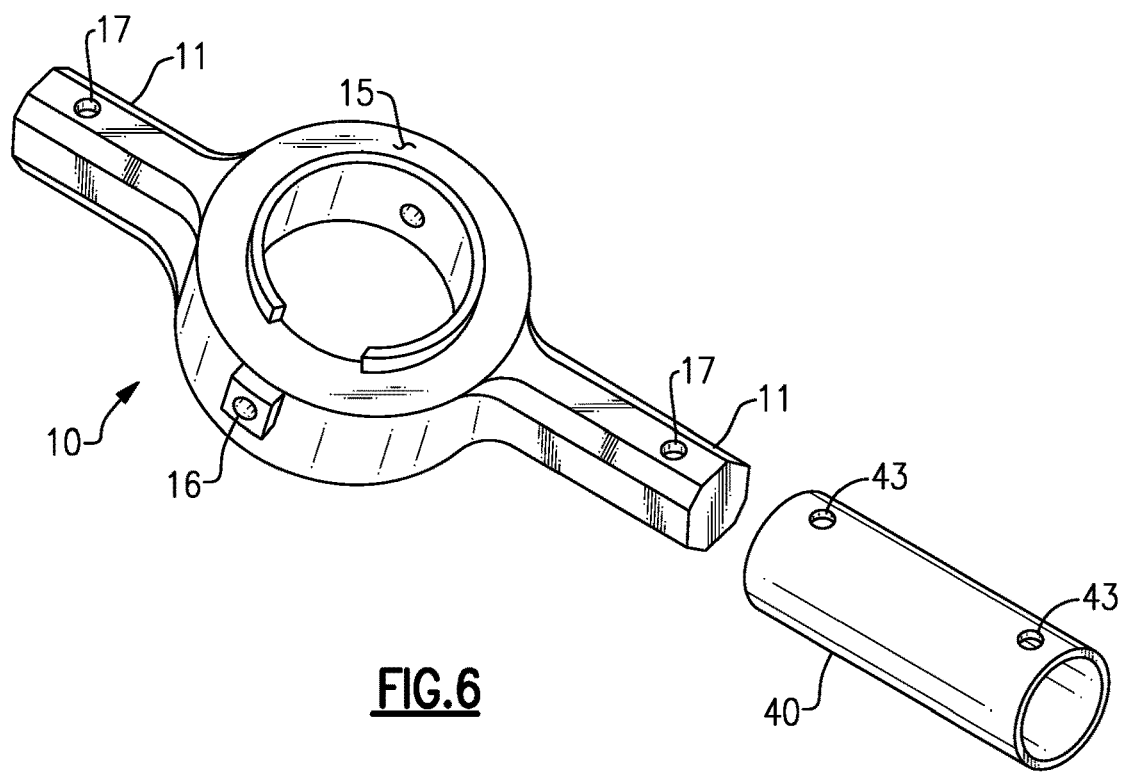
FIG. 6 is an perspective view of another embodiment.

FIG. 6 illustrates another possible embodiment, where a pair of octagonal support stub members 11 radiate out from the main body tube 15. The support stub members of this profile can receive and support attachment arms of square, octagonal or round profile, and here are shown with an associated attachment arm 40 of round, tubular shape. The attachment arms 40 are provided with pin openings 43 to permit a removable pin to penetrate through an associated pin opening 17 in the support stub member 11.

Figure 6A:
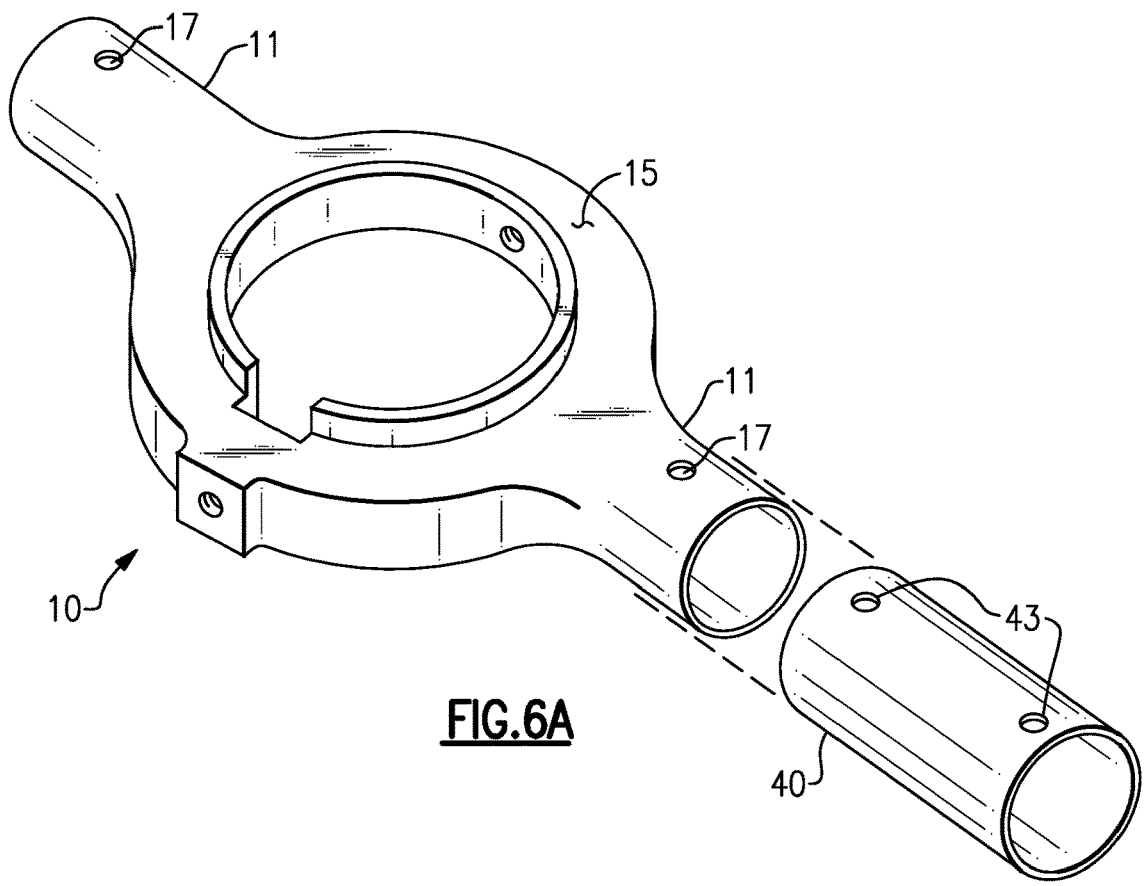
FIGS. 6A and 6B are variations thereof showing male and female extension arms respectively mounted on the marine hub main body portion.
Figure 6B:
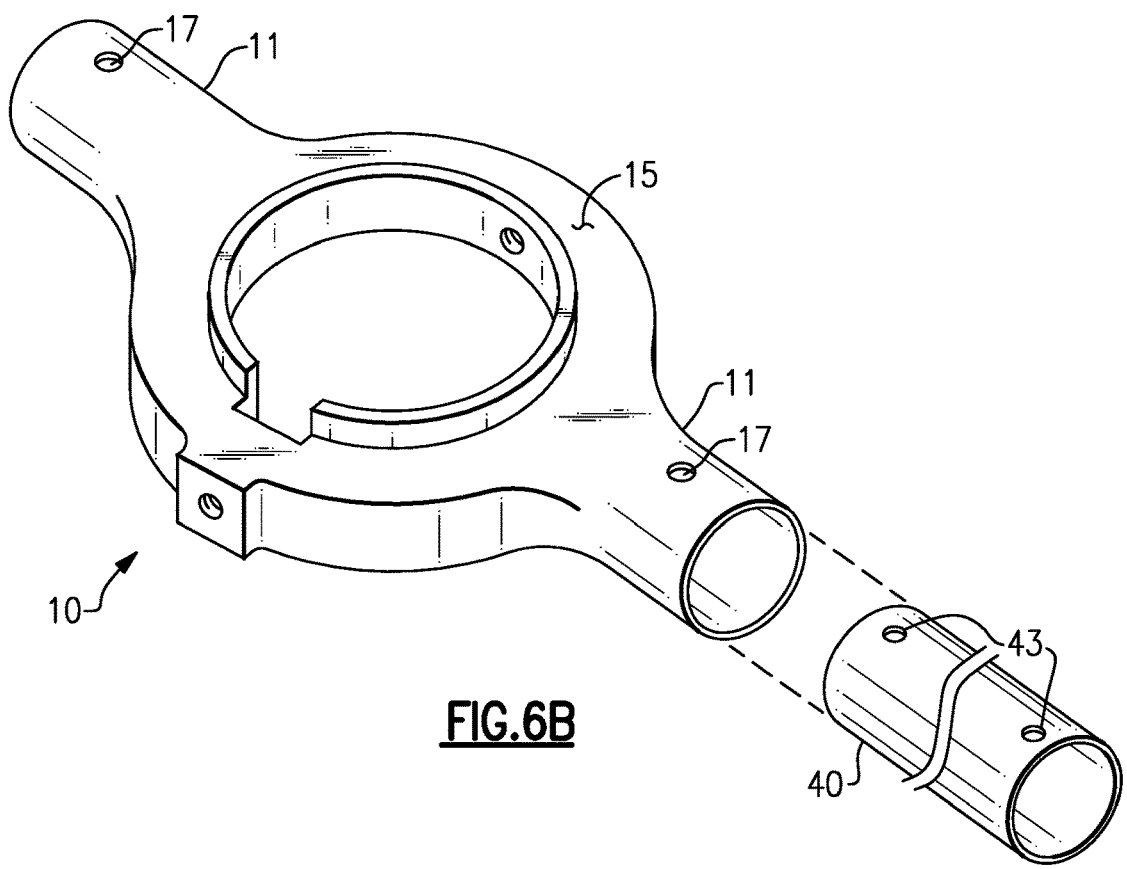

FIGS. 6A and 6B show embodiments of the marine hub 10 similar to that of FIG. 5, but in which the support stub members 11 are round, tubular members. This construction permits a larger diameter tubular attachment arm 40 to fit over the support stub member (FIG. 6A) or a smaller diameter attachment arm 40 so slide within the support stub member (FIG. 6B). In either case, the mating pin openings 17 and 43 on the support stub member and attachment arm are aligned and the attachment arm is secured by placing a quick-release pin (not shown here) through the aligned openings.

Figures 7A, 7B:
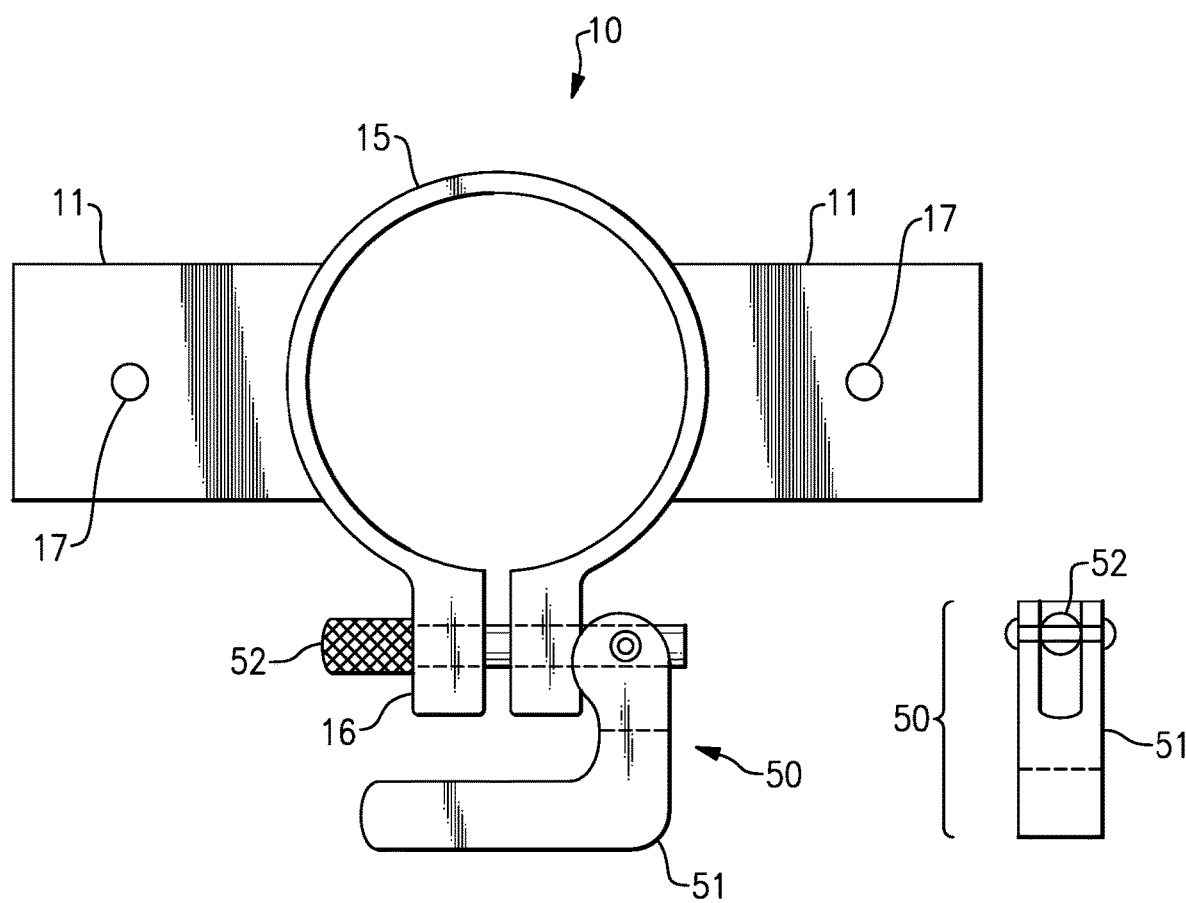
FIG. 7A and FIG. 7B are a top plan view of a cam-action based clamp on an embodiment of this invention, and a side elevation of a portion thereof.

FIGS. 7A and 7B illustrate an alternative marine hub 10 wherein the main body tube 15 is clamped by means of a cam mechanism 50 instead of the hand screw clamp mechanism described previously. In this embodiment, the clamp mechanism 50 has a cam lever 51 that pivots on one end of a clamp pin 52 that penetrates the clamp lugs 16. The cam lever 51 is closed to the position shown to secure the marine hub 10 to the associated support post, and is opened (i.e., swung in the counter-clockwise direction in FIG. 7A) to open and release the marine hub.

Figure 8:
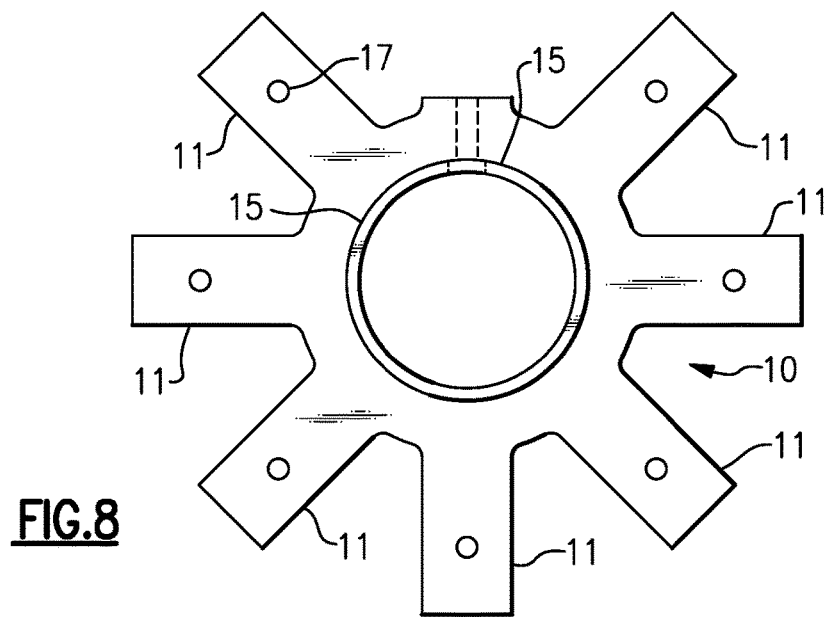
FIG. 8 is a top plan view of an embodiment of the invention having a multiplicity of mounting stubs for attachment arms.

The marine hub may be provided with a multitude of support stubs 11, as shown in FIG. 8, in this example, with seven support stub members 11 radiating out away from the main body tube 15. Each of these may be used to support an individual attachment arm, although the user may choose to employ only some of these.

Figure 9A:
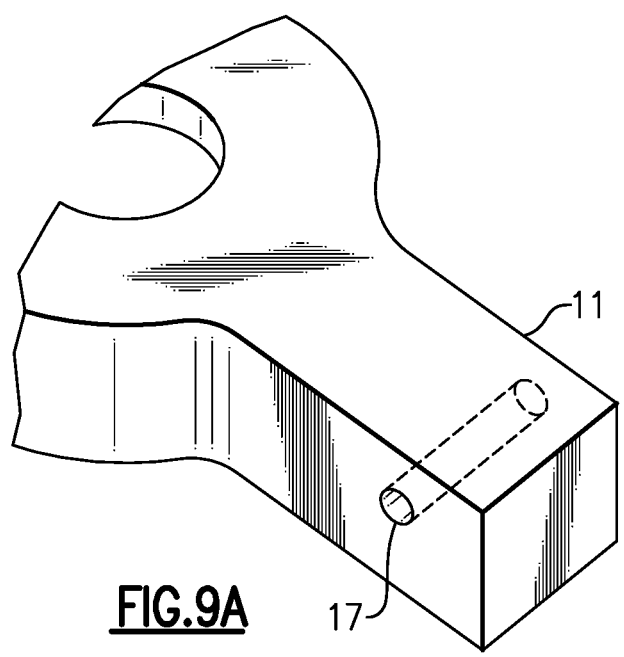
Figure 9B:
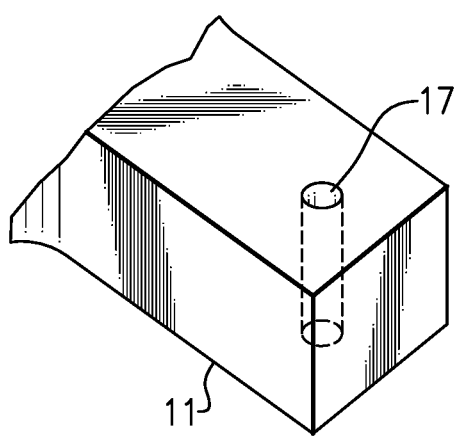
FIGS. 9B and 9C show variations in placement of through hole(s) in mounting stubs or sockets thereof.
Figure 9C:
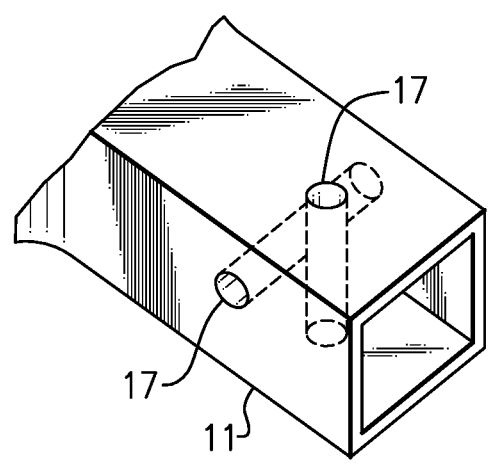

As shown in FIGS. 9A, 9B, and 9C the marine hub may have the pin openings 17 in the support stub members 11 oriented horizontally (FIG. 9A), or vertically (FIG. 9B), although in some embodiments there may be pin openings 17 oriented in both directions (FIG. 9C). This permits the user to orient the attachment arms in either orientation.

Figure 10A:
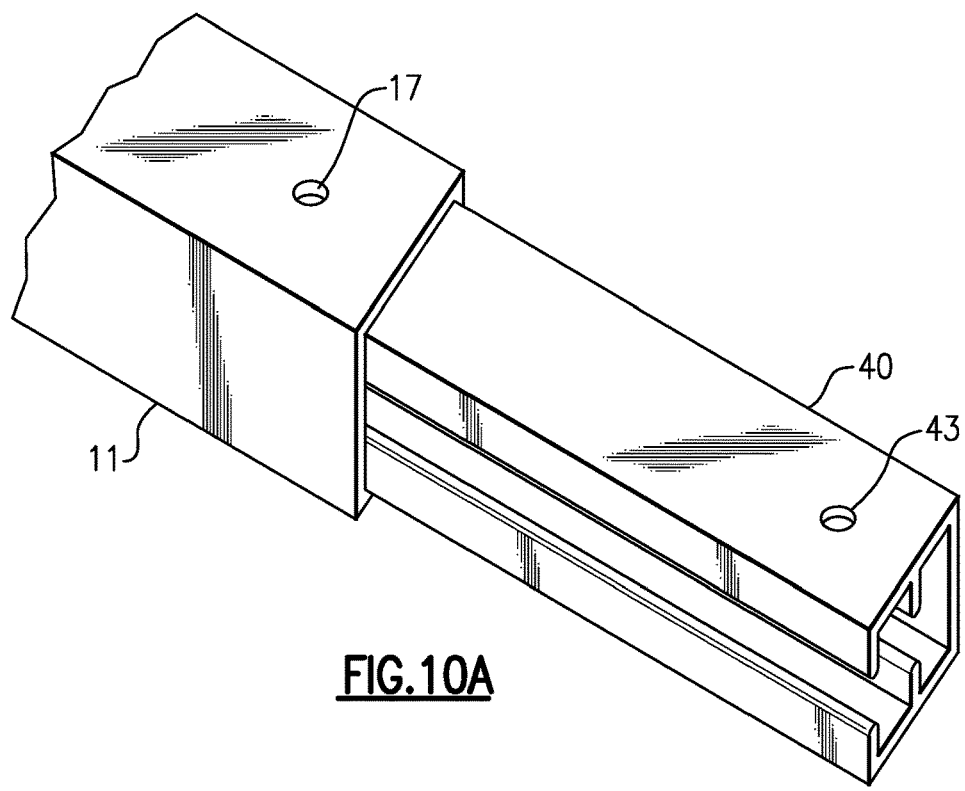
FIG. 10A is a perspective of a portion of another embodiment.
Figure 10B:
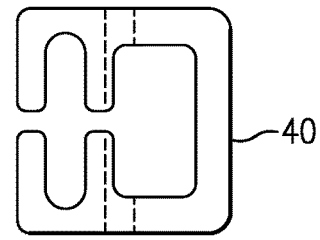
FIG. 10B is an end view of an attachment arm thereof.

The attachment arms 40 may favorably be embodied as extruded members having an elongated opening along one edge, as illustrated in FIG. 10A and interior ribs or flanges as illustrated for example in FIG. 10B, that create a keyway of a predetermined profile, so as to accept certain keyway-mounted accessories. This is useful for accepting accessories designed to fit into a gunwale keyway of the type incorporated into some watercraft.

Figure 11:
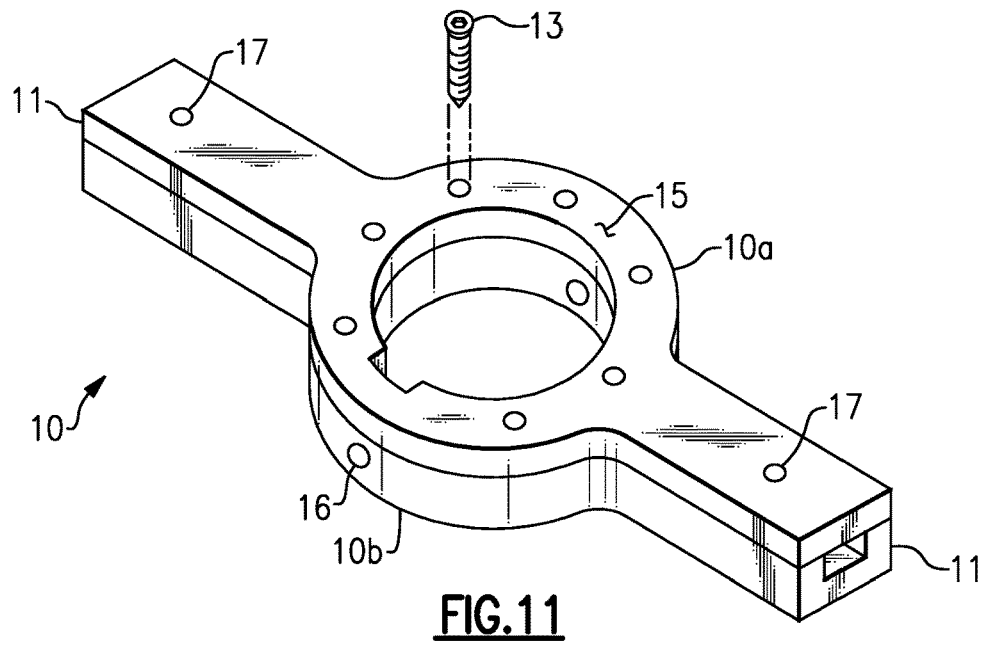
FIG. 11 is a perspective of a two piece embodiment with unitary mounting stubs.
Figure 12:
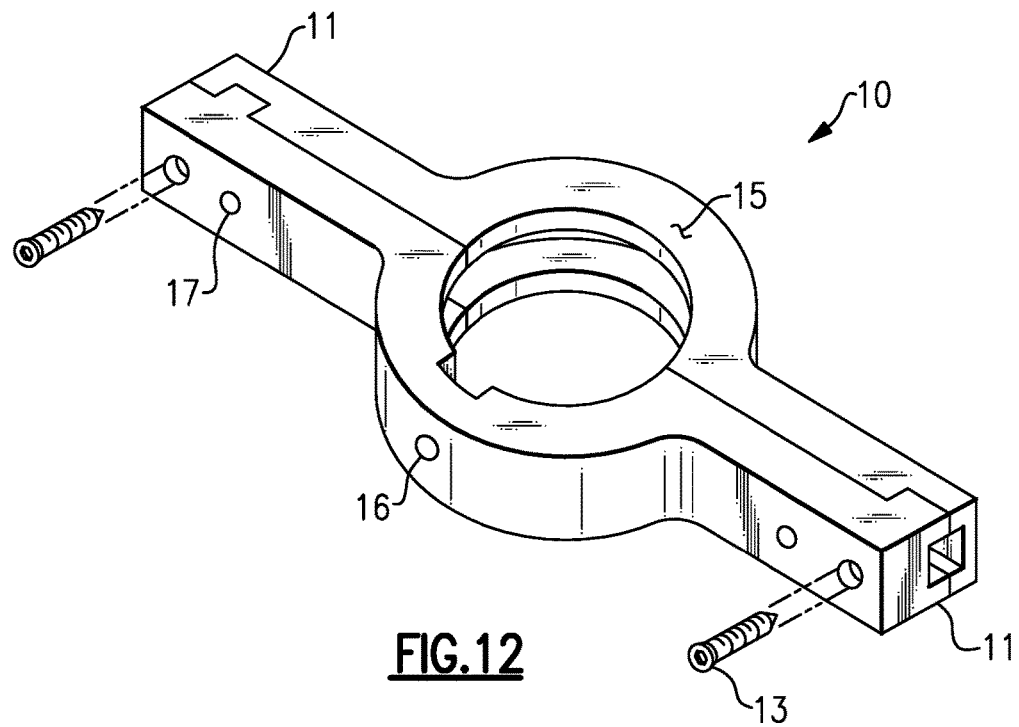
FIG. 12 is a perspective view of a variation thereof.

FIG. 11 illustrates an embodiment of the marine hub 10 with a split construction, with a top plate 10a overlying a bottom member 10b so that the two are co-extensive and together form the main body tube 15 and the support stub members 11. These can be secured together using threaded fasteners 13 that fit into associated female threaded openings in the marine hub. An alternative version of this construction of marine hub is shown in FIG. 12, where the marine hub is split into right and left sections, 10c and 10d, which are fastened to one another using threaded members 13. As shown here these may be keyed along the parting line so that they can be attached to each other only in one manner.

Figure 13:
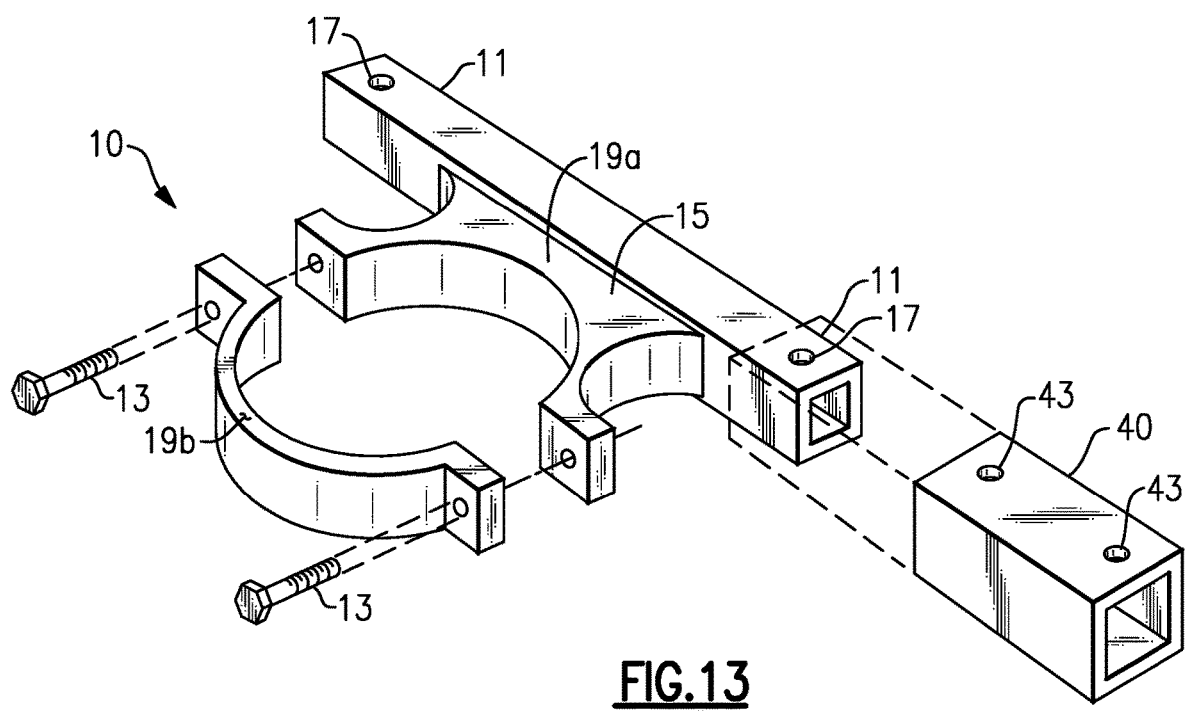
FIG. 13 is another embodiment in which the hub member is formed of two half-rings.

FIG. 13 illustrates another variation of the marine hub 10 in which the main body tube 15 is formed of mating halves 19a, 19b with end flanges that receive threaded fasteners 13, 13. Here the body tube half 19a is fused to a square tube whose ends form a pair of stubs 11, 11, to which an attachment arm 40 may be attached. The two halves 19a, and 19b are intended to be bolted to one another around the pedestal or other support post with a pair of threaded connectors (e.g., bolts), and with an adapter ring (not shown) employed as needed to match the inner diameter formed by the two ring halves 19a, 19b.

Figure 14A:
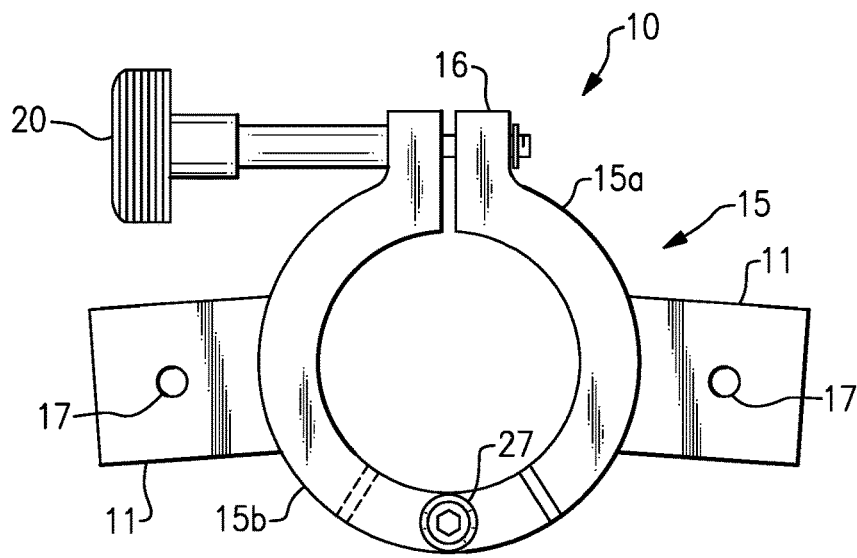
FIGS. 14A and 14B are a top plan view and a partial elevation of another embodiment.
Figure 14B:
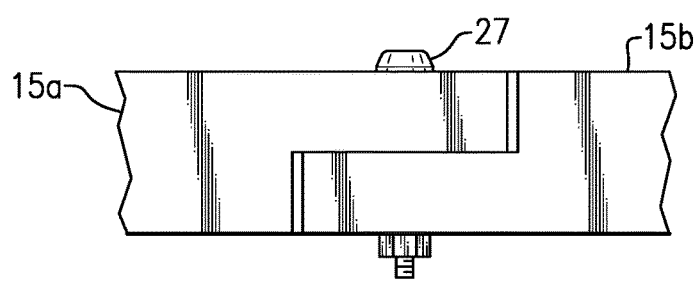

A hinged or swing-together version of a marine hub 10 is shown in FIGS. 14A and 14B, in which the main tube body 15 is formed in two halves 51a and 15b, which are hinged or pivoted at a pivot pin or bolt 27, and with the clamp lugs 16 at the opposite side, as shown. With this design, the marine hub can be installed around a seat post or pedestal without need to remove the seat or other items already present on the pedestal or post. The main body tube 15 can be clamped tight to the pedestal by turning the hand screw 20 that penetrates the two clamp lugs.

Figure 15:
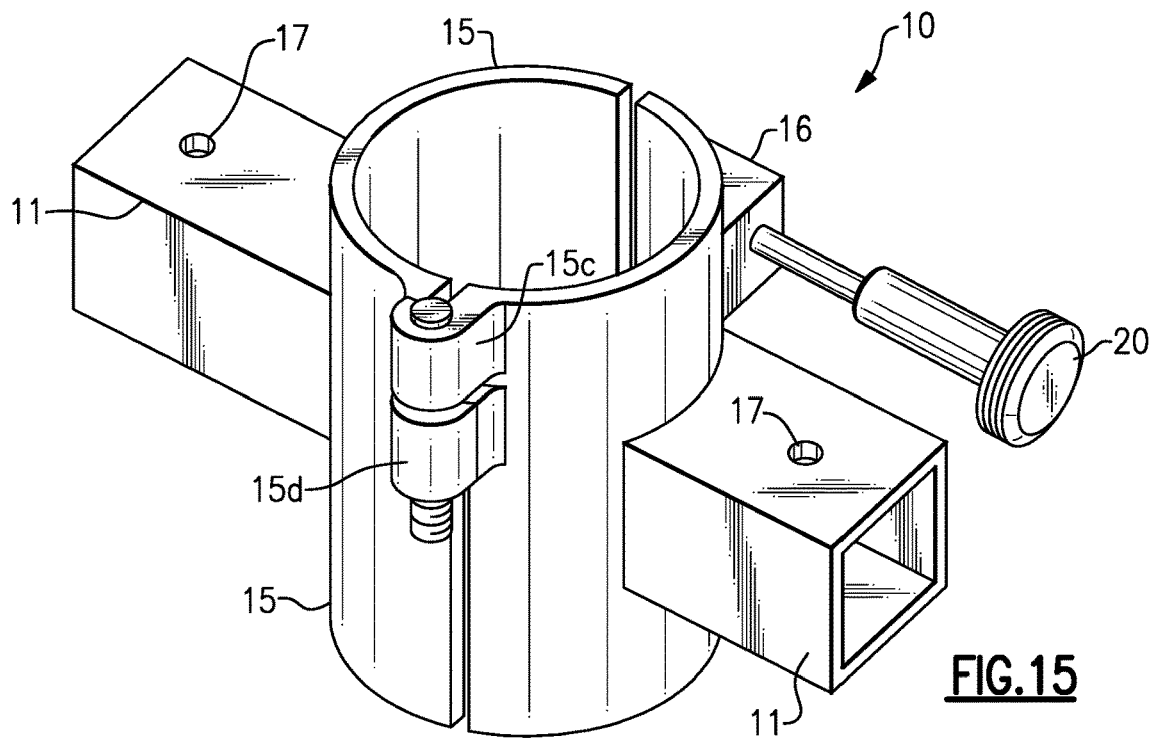
FIG. 15 is a perspective view showing a variation of this embodiment.

FIG. 15 shows an alternative arrangement of the marine hub of FIGS. 14A and 14B in which the main tube body 15 is in the form of two tube halves, with upper and lower hinge members 15c and 15d positioned alongside one vertical gap, and with the clamp lugs positioned alongside an opposite vertical gap.

Figure 16:
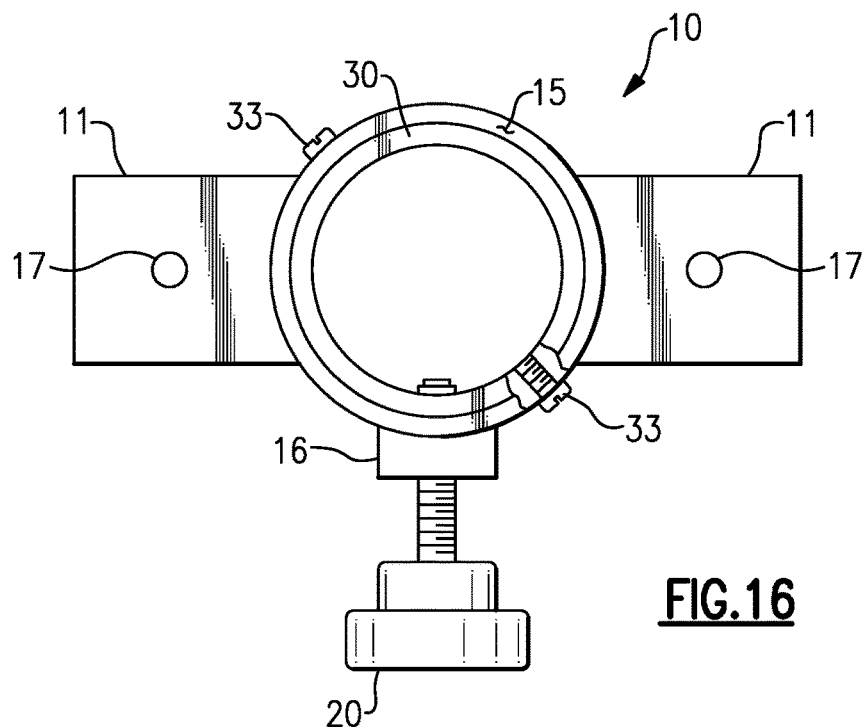
FIG. 16 is a top plan view of a further embodiment of the invention.

FIG. 16 is a top plan view, partly cut away, showing an adapter ring 30 in place within the interior of the main tube body 15, and held in place by ring fastener screws 33.

Figure 17:
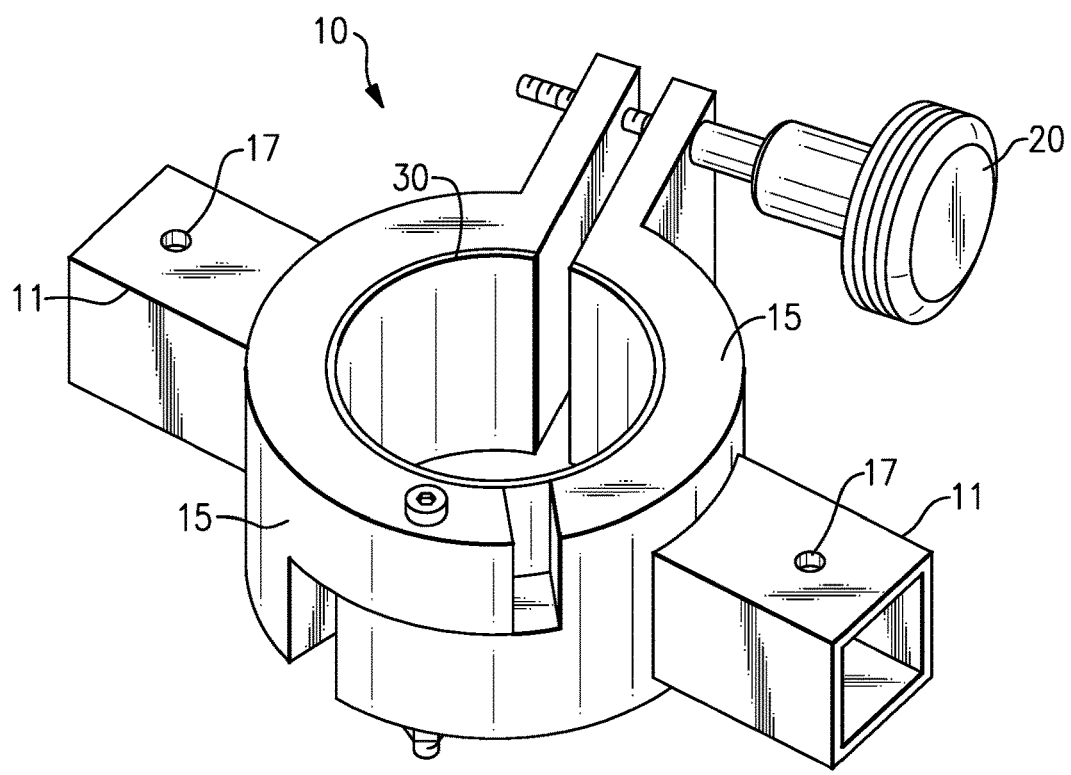
FIG. 17 is a perspective view of a variation of the foregoing embodiment.

FIG. 17 is a perspective view showing a possible positioning of an adapter ring 30 in place in the main tube body 15 of a swing-open or hinged embodiment of the marine hub 10.

While the marine hubs described above are intended for convenient positioning and holding of fishing rods and other marine equipment on a boat pedestal or post, these devices may be employed favorably ashore or at the water's edge. FIG. 18 shows an example of a marine hub 10 mounted on a dock post 114 that is used to support the decking of a dock or pier. These posts 114 may be a different diameter from that of a boat pedestal, but an adapter ring of the appropriate size is supplied to permit secure mounting on the post 114. Here the marine hub is shown with a pair of attachment arms 40, and with a drink holder 62 mounted on one of the arms to hold a drink container, and a device support 64 mounted on the other arm for securely holding a device such as a camera, mobile phone or lamp.

As shown in FIG. 19, a lanyard 19 is favorably attached onto the retaining pin 12 to help prevent its loss. The other end of the lanyard 19 can be fastened to a clamp 66, either magnetic or mechanical, so as to secure to a component of the boat or of the marine hub. Alternatively, as shown in FIG. 20, the other end of the lanyard may be attached to a float 68 to assist in its retrieval in case the pin 12 falls overboard.

Figure 21:
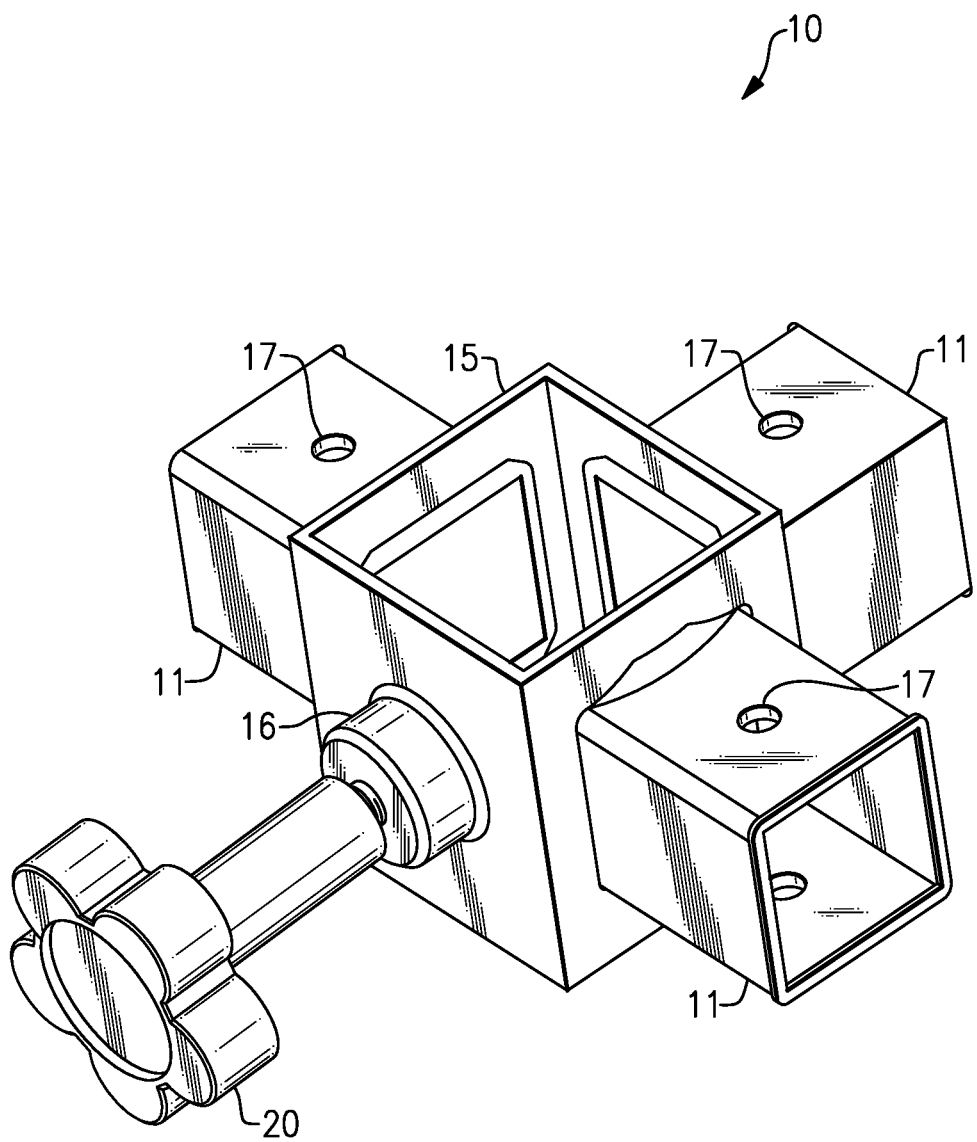
FIG. 21 shows a marine hub embodiment for mounting on a square post.

FIG. 21 is another embodiment of this invention, here adapted for mounting on a square cross-section vertical post. Elements shown here that are the same as in earlier embodiments identified with the same reference numbers, and a detailed description thereof need not be repeated. Here the main body tube 15 is configured as a square tube, with plugs or stubs 11 protruding from three of the four sides, and a block member and hand screw member 20 being positioned on the fourth side.

Many other accessories can be supported on the attachment arms of the marine hub, such as a solar panel, marine radio, fishing tackle container, or toolbox. Moreover, an extender accessory may be used to join a second attachment arm to another attachment arm end-to-end for applications where a longer arm is needed.

The embodiments and variations of the marine hub, as discussed here and as shown in the drawing figures, are not by any means exclusive, and many other possible marine hubs can operate according to the same principles. Rather, many modifications and variations of the marine hub would occur to persons of skill in the art, without departing from the scope and spirit of the invention, as defined in the claims.

What is claimed is:

1. In combination, a seat pedestal of a boat, the seat pedestal being in the form of a vertical generally cylindrical support post, and a marine hub adapted to be positioned on said seat pedestal below a too thereof comprising:
    a generally round-profile one-piece hub body member having a vertically oriented central bore extending vertically therethrough and adapted to permit the hub to be positioned at plural positions along said seat pedestal and to fit snugly onto said seat pedestal, said hub body member being formed of a marine grade aluminum, stainless steel, or equivalent plastic resin;
    means on said body member releasably gripping said seat pedestal to hold the body member securely in place thereon;
    a plurality of rigid, non-adjustable support stub members protruding generally radially and horizontally outward from said body member, with outer ends thereof which serve as a male or female socket member, wherein said support stub members are rigidly affixed onto said body member;
    a plurality of elongated attachment arms each having a female or male socket member formed at a radially inward end thereof and adapted for fitting removably onto a respective one of said support stub members, such that said attachment arms are held in a fixed orientation on said hub body member;
    said socket members of said attachment arms and said socket members of said support stub members each having at least one through-bore extending transversely through the respective attachment arm and stub member, and configured such that the through-bores align when the respective attachment arms are placed onto the associated support stub members; and at least one removable retaining pin adapted for penetrating aligned through-bores of said support stub members and attachment arms to hold the attachment arms removably in place supported on said marine hub body member.

2. The combination of claim 1 wherein said support stub members are of square cross section and the socket members of said attachment arms are square tubular members.

3. The combination of claim 1 wherein said support stub members are of polygonal cross section and said socket members of said attachment arms are of round, octagonal, or hexagonal section.

4. The combination of claim 1 wherein there are three of said support stub members and three of said attachment arms, disposed on said body member at a nine-o'clock position, a twelve-o'clock position, and a three-o'clock position, respectively.

5. The combination of claim 1 wherein said at least one retaining pin includes a quick-release pin having a smooth shaft not retained by threads, and with a hand grip affixed at one end, and a lanyard attached thereto.

6. The combination of claim 1 wherein said plurality of elongated attachment arms includes at least one extruded tubular member having a gap formed along one side and a keyway formed therein, and adapted for receiving keyway mounted accessories therein.

7. The combination of claim 1 wherein the body member and stub members of said marine hub are unitarily molded of a suitable polymer resin.

8. A marine hub comprising
    a generally round-profile hub body member having a vertically oriented central bore adapted to fit snugly onto a vertical generally cylindrical support post, said hub body member being formed of a marine grade aluminum, stainless steel, or equivalent plastic resin;
    means on said body member releasably gripping said support post to hold the body member securely in place thereon;
    a plurality of rigid, non-adjustable support stub members protruding generally radially and horizontally outward from said body member, with outer ends thereof which serve as a male or female socket member, wherein said support stub members are rigidly affixed onto said body member;
    a plurality of elongated attachment arms each having a female or male socket member formed at a radially inward end thereof and adapted for fitting removably onto a respective one of said support stub members, such that said attachment arms are held in a fixed orientation on said hub body member;
    said socket members of said attachment arms and said socket members of said support stub members each having at least one through-bore configured such that the through-bores align when the respective attachment arms are placed onto the associated support stub members;
    at least one removable retaining pin adapted for penetrating aligned through bores of said support stub members and attachment arms to hold the attachment arms removably in place supported on said marine hub body member, and
    further comprising a split adapter ring formed of said marine grade aluminum, stainless steel, or equivalent plastic resin, and dimensioned for fitting within the central bore of said body member and over said generally cylindrical support post.

9. The marine hub of claim 8, wherein a narrow slit in the adapter ring aligns with a axial gap in the body member of the marine hub.

10. A marine hub comprising
a generally round-profile one-piece hub body member having a vertically oriented central bore extending vertically therethrough and adapted to fit snugly onto a vertical generally cylindrical support post, said hub body member being formed of a marine grade aluminum, stainless steel, or equivalent plastic resin;
means on said body member releasably gripping said support post to hold the body member securely in place thereon;
a plurality of rigid, non-adjustable support stub members protruding generally radially and horizontally outward from said body member, with outer ends thereof which serve as a male or female socket member, wherein said support stub members are rigidly affixed onto said body member;
a plurality of elongated attachment arms each having a female or male socket member formed at a radially inward end thereof and adapted for fitting removably onto a respective one of said support stub members, such that said attachment arms are held in a fixed orientation on said hub body member;
said socket members of said attachment arms and said socket members of said support stub members each having at least one through-bore extending transversely through the respective attachment arm and stub member, and configured such that the through-bores align when the respective attachment arms are placed onto the associated support stub members; and
at least one removable retaining pin adapted for penetrating aligned through-bores of said support stub members and attachment arms to hold the attachment arms removably in place supported on said marine hub body member, and
wherein said body member is in the form of a split tube having an axial gap therein with a pair of lugs affixed to said split tube adjacent respective opposite sides of said gap, and including compressing means for drawing the lugs towards one another to compress the central bore against said support post.

11. The marine hub of claim 10 wherein said compressing means includes a cam action clamp having a pin passing through said lugs, and a lever-action cam disposed on one end of said pin.

12. The marine hub of claim 10 wherein said compressing means includes a hand screw having a threaded rod passing through an opening in one of said lugs and engaging a threaded bore in the other of said lugs, and a handle grip affixed at one end of the threaded rod.

13. A marine hub comprising
a generally round-profile hub body member having a vertically oriented central bore adapted to fit snugly onto a vertical generally cylindrical support post, said hub body member being formed of a marine grade aluminum, stainless steel, or equivalent plastic resin;
means on said body member releasably gripping said support post to hold the body member securely in place thereon;
a plurality of rigid, non-adjustable support stub members protruding generally radially and horizontally outward from said body member, with outer ends thereof which serve as a male or female socket member, wherein said support stub members are rigidly affixed onto said body member;
a plurality of elongated attachment arms each having a female or male socket member formed at a radially inward end thereof and adapted for fitting removably onto a respective one of said support stub members, such that said attachment arms are held in a fixed orientation on said hub body member;
said socket members of said attachment arms and said socket members of said support stub members each having at least one through-bore configured such that the through-bores align when the respective attachment arms are placed onto the associated support stub members; and
at least one removable retaining pin adapted for penetrating transversely aligned through bores of said support stub members and attachment arms to hold the attachment arms removably in place supported on said marine hub body member; and further comprising
an adapter ring fitted into the central bore of said body member, and having an outer diameter to match the inner diameter of said central bore and an inner diameter to match the outer diameter of said cylindrical support post, and wherein one of said adapter ring and said body member has an aperture extending radially therethrough, and a retaining member fits into said aperture and into the other of said body member and said adapter ring to hold the adapter ring in place.

14. The marine hub of claim 13 wherein a narrow slit in the adapter ring aligns with a corresponding narrow slit in the body member of the marine hub.

15. The marine hub of claim 13, wherein there are three of said support stub members and three of said attachment arms, disposed on said body member at a nine-o'clock position, a twelve-o'clock position, and a three-o'clock position, respectively.

* * * * *